United States Patent [19]

Essert

[11] Patent Number: 5,392,373
[45] Date of Patent: Feb. 21, 1995

[54] APPARATUS FOR OPTICALLY COUPLING AN OPTICAL FIBER TO AN ELECTRO-OPTIC DEVICE

[75] Inventor: Robert Essert, Glen Ellyn, Ill.

[73] Assignee: The Whitaker Corporation, Wilmington, Del.

[21] Appl. No.: 158,756

[22] Filed: Nov. 29, 1993

[51] Int. Cl.⁶ .............................................. G02B 6/42
[52] U.S. Cl. .................................... 385/92; 385/88
[58] Field of Search ................................. 385/88-94

[56] References Cited

U.S. PATENT DOCUMENTS

| | | | |
|---|---|---|---|
| 4,515,434 | 5/1985 | Margolin et al. | 385/88 X |
| 4,722,586 | 2/1988 | Dodson et al. | 385/92 |
| 4,756,591 | 7/1988 | Fischer et al. | 385/88 |
| 5,121,456 | 6/1992 | Essert et al. | 385/70 |
| 5,243,673 | 9/1993 | Johnson et al. | 385/90 |

*Primary Examiner*—John D. Lee
*Attorney, Agent, or Firm*—Trexler, Bushnell, Giangiorgi & Blackstone, Ltd.

[57] ABSTRACT

Apparatus for achieving an optical connection between an optical fiber and electro-optic device comprises a fiber optic connector comprising a pair of elongated connector elements having facing substantially flat surfaces and an elongated groove on at least one of the surfaces for receiving an optical fiber to be retained between the connector elements. A resilient clamping member maintains the connector elements in engagement with each other so as to retain the optical fiber in the groove. A coupling portion projecting from the clamping member for joining the clamping member with the electro-optic device in such a manner that an optical fiber retained in the connector is in optical alignment with a predetermined portion of the electrooptic device.

15 Claims, 2 Drawing Sheets

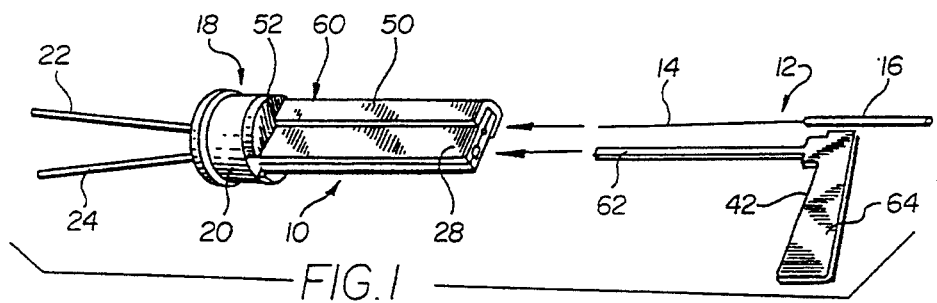
FIG.1
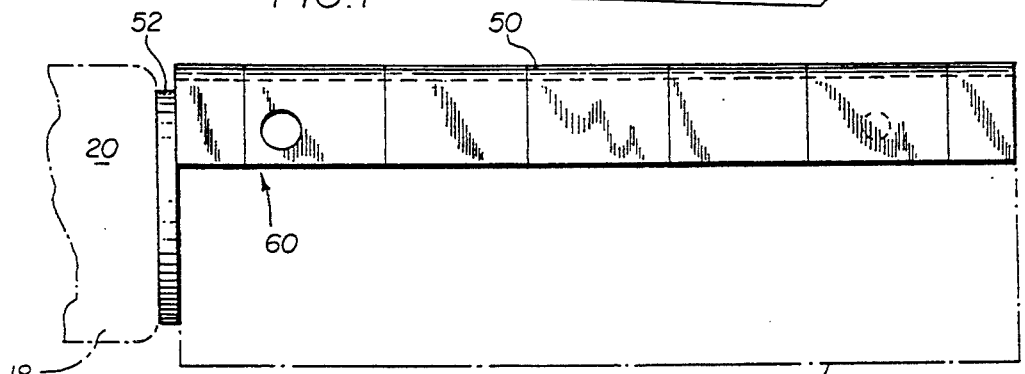
FIG.2
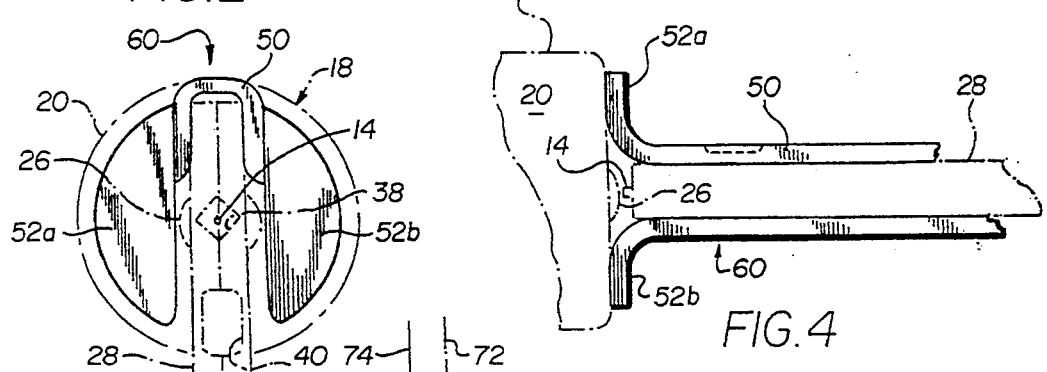
FIG.3
FIG.4
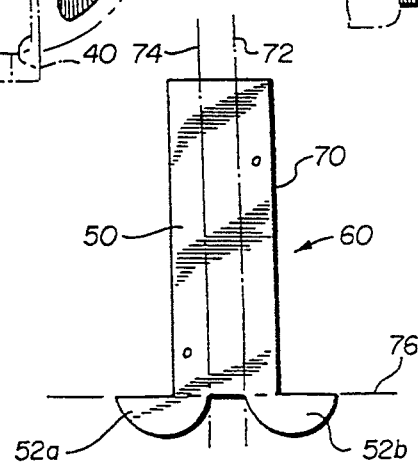
FIG.5

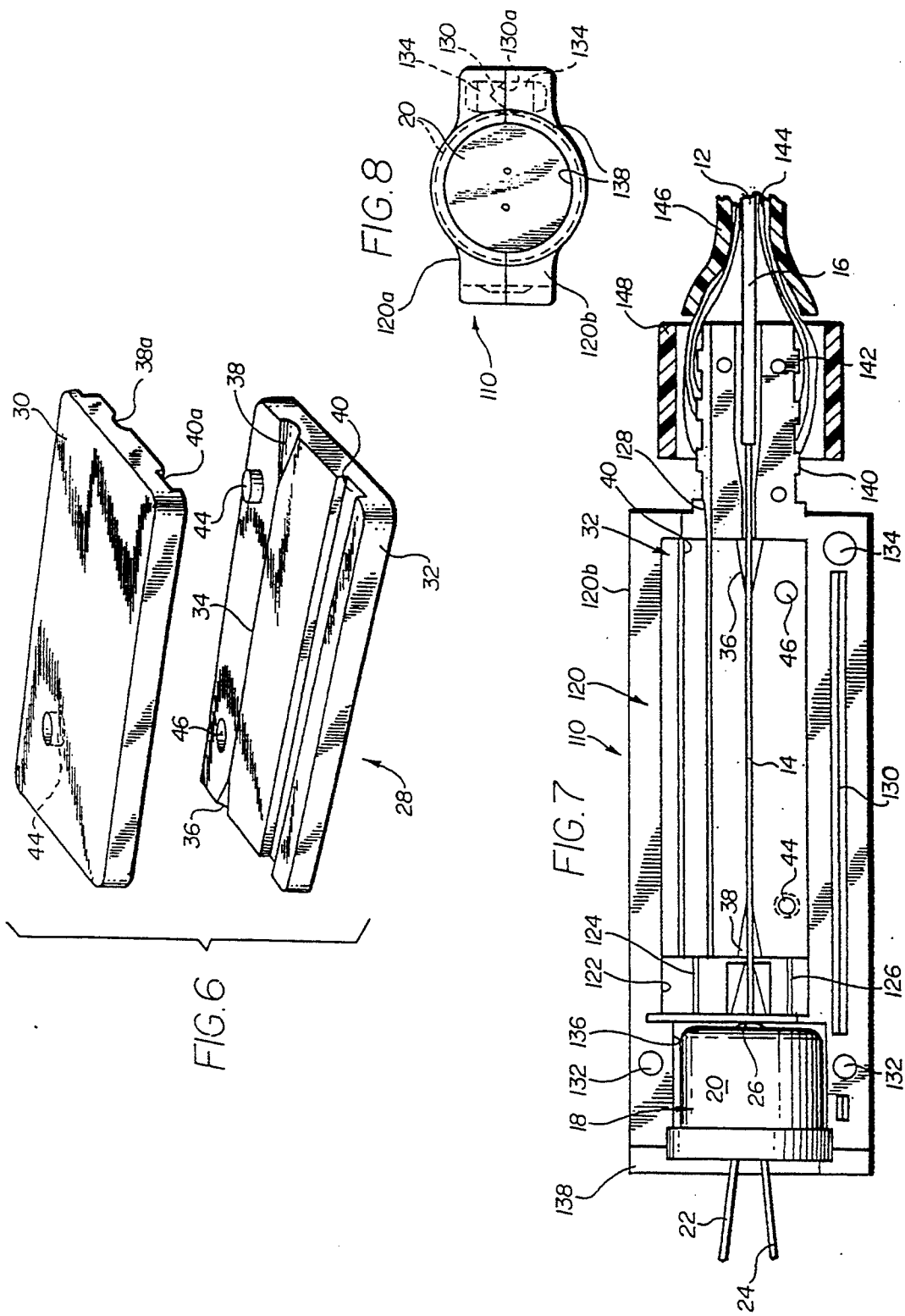

APPARATUS FOR OPTICALLY COUPLING AN OPTICAL FIBER TO AN ELECTRO-OPTIC DEVICE

BACKGROUND OF THE INVENTION

This invention is directed generally to the optical transmission arts, and more particularly to novel apparatus for establishing an optical connection between an optical fiber and an electro-optic device.

Electro-optic devices as the term is utilized herein generally include light emitting diodes (LED's), laser diodes and detector cells such as p-i-n diodes. In some applications, it is desired to transmit light to an optical input or from an optical output of such a device by means of an optical fiber. Such optical fibers are well known in fiber optic technology and transmit light internally by principles of reflectance, based upon the indexes of refraction of the materials utilized to construct the fiber.

Successful transmission of light energy between an electro-optic device and an optical fiber is greatly enhanced by alignment of the axis of the optical input (or output) of the device with the axis of the fiber. This alignment must be initially located and thereafter maintained in order to assure the desired quality of optical transmission between the fiber and the device input.

The present invention utilizes an optical fiber connector element for receiving and holding optical fiber which is to be aligned with an optical input of an electro-optic device such as a p-i-n diode. Preferably, the invention utilizes a pair of complementary aluminum alloy elements of the type which heretofore have been utilized as splice elements for splicing together a pair of optical fibers. Such a splice element is shown and described for example in U.S. Pat. No. 5,121,456, which is commonly owned herewith However, these elements are utilized in the present invention to receive and grippingly engage a single fiber in order to align an end part of the fiber in coaxial alignment with an axis of an optical input (or output) of an electro-optic device.

The present invention utilizes mechanical means for receiving and holding both the electro-optic device and the connector elements in the proper alignment for achieving coaxial alignment of an optical fiber end portion held between the connector elements with the axis of an optical input of the electro-optic device. While the ensuing description describes two specific arrangements for achieving this mounting and alignment function, other equivalent arrangements might be utilized without departing from the invention.

OBJECTS AND SUMMARY OF THE INVENTION

It is a general object of the invention to provide a novel apparatus for maintaining an optical coupling or connection between an optical fiber and an electro-optic device.

Briefly, and in accordance with the foregoing object, apparatus for achieving an optical connection between an optical fiber and electro-optic device comprises a fiber optic connector comprising a pair of elongated connector elements having facing substantially flat surfaces and means defining an elongated groove on at least one of said surfaces for receiving an optical fiber to be retained between said connector elements; resilient clamping means for maintaining said connector elements in engagement with each other so as to retain said optical fiber in said groove defined therein, and coupling means for joining the clamping means with said electro-optic device in such a manner that an optical fiber retained in said connector element is in optical alignment with a predetermined portion of the electrooptic device.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 is a perspective view of apparatus in accordance with a preferred form of the invention;

FIG. 2 is an enlarged side elevation of a bracket portion of the apparatus of FIG. 1;

FIG. 3 is an end elevation taken generally from the right hand side of FIG. 2;

FIG. 4 is partial side elevation taken generally from the bottom of FIG. 2;

FIG. 5 is a plan view of a flat blank element which may be utilized to form the bracket element of FIGS. 1-4;

FIG. 6 is an exploded perspective view of a connector element comprising complementary connector halves in accordance with the invention;

FIG. 7 is a longitudinal sectional view through an apparatus in accordance with a second embodiment of the invention; and FIG. 8 is an end elevation taken generally in the plane of the line 8—8 of FIG. 7 and additionally showing a second complementary half of a housing element of the assembly of FIG. 7.

DETAILED DESCRIPTION OF THE ILLUSTRATED EMBODIMENT

Referring now to the drawings, and initially to FIGS. 1-5, an apparatus for optically coupling an optical fiber to an electro-optic device is generally designated by the reference numeral 10. In FIG. 1, an optical fiber is indicated generally by the reference numeral 12 and includes a fiber portion 14 and a surrounding buffer portion 16. In the embodiment shown for purposes of description, electro-optic device is illustrated as a p-i-n photodiode 18. However, the invention might be utilized-to achieve an optical connection between the optical fiber 12 and another type of electro-optic device such as an LED, a phototransistor, etc. without departing from the invention. The diode 18 includes a generally cylindrical metallic housing 20, a pair of projecting leads 22, 24 and an optical input 26 (see FIG. 4) which may comprise a lens.

The apparatus 10 of the invention includes a fiber optic connector member or structure 28. As best viewed in FIG. 6, this fiber optic connector preferably takes the form of a pair of complementary aluminum alloy elements 30, 32. These elements 30 and 32 are of the type which are illustrated and described as splice elements for splicing together a pair of optical fibers in U.S. Pat. No. 5,121,456, the description of which is hereby incorporated by reference to the extent it describes these elements.

As shown in FIG. 6, each of the elements 30 and 32 comprises a generally elongate, flat rectangular element. The two elements are of complementary form, and in the illustrated embodiment each defines one-half of a longitudinally running groove for receiving and holding an optical fiber such as fiber 14 between the elements 30 and 32. One-half of this groove 34 is visible in the view of FIG. 6, it being understood that the complementary connector element 30 has an identical groove therein positioned for alignment with the groove 34 when the elements 30 and 32 are joined. The groove 34 terminates in oppositely facing generally conical entrance sections 36, 38, which are likewise formed or defined one-half on each of the elements 30, 32. The complementary half of entrance 38 is indicated by reference numeral 38a on element 30 in FIG. 6.

Connector elements 30, 32 further define an operating means, here taking the form of a longitudinally formed groove or channel 40, one-half of which is defined in each element. The complementary half of groove 40 in element 30 is indicated by reference numeral 40a in FIG. 6. In the illustrated embodiment the operating means or groove 40 is generally rectangular in cross section. The operating channel 40 is generally parallel with and spaced laterally from the fiber receiving groove 34. This groove 40 is formed for accommodating a tool or "key" 42 (see FIG. 1) which is utilized, as will be more fully explained hereinbelow, to part the connector elements 30, 32 to an extent necessary to permit either placement of or removal of an optical fiber with respect to the groove 34. Preferably, alignment and locating means in the form of complementary projections or embossments 44 and receiving recesses 46 are also formed in the respective connector elements or halves 30, 32 and are preferably formed to the opposite side of groove 34 from the operating channel 40.

Referring again to FIG. 1, the apparatus 10 further includes resilient clamping means 50 for maintaining the elements 30, 32 of the connector 28 in engagement with each other in such a manner that they will retain an optical fiber 14 in the groove 34 defined therein. The apparatus 10 further includes coupling means 52 for joining the clamping means with the electro-optic device 18 in such a manner that the optical fiber 14 retained in the connector element 28, which is in turn held in the clamping means 50, will be in optical alignment with a predetermined portion of the electro-optic device. In the illustrated embodiment, this predetermined portion comprises the optical input or lens 26 of the p-i-n diode 18. In the illustrated embodiment, the desired optical alignment is achieved by coaxially aligning the fiber 14 with the lens or optical input 26.

In the embodiment illustrated in FIGS. 1-5, the resilient clamping means 50 and the coupling means 52 are part of a unitary bracket member 60. In this regard, the clamping means 50 will be seen to comprise an elongate generally U-shaped channel or resilient clamping portion which resiliently engages and maintains the connector elements 30, 32 therebetween with a resilient force of engagement. This force of engagement is sufficient to hold the connector elements 30 and 32 in engagement with each other with sufficient force to retain the optical fiber 14 within the groove 34.

It will now be recognized that the tool or "key" 42 when applied to the operating groove or channel 40 may be used to overcome the above-described force of engagement to permit insertion or removal of an optical fiber with respect to the groove 34. In this regard, the tool 42 preferably includes an elongate operating portion 62 which projects from an enlarged gripping portion or surface 64 which is preferably formed perpendicular thereto. The operating portion 62 is preferably of similar rectangular cross section to the groove 40, such that rotation of the tool 42 through substantially 90° will tend to force the elements 30 and 32 slightly apart in the area of the groove 40. This forcing apart will cause sufficient parting of the elements in the area of the fiber receiving channel or groove 34 to permit the introduction or removal of a fiber with respect thereto.

In the illustrated embodiment, the coupling means comprise a pair of substantially flat surfaces or ears 52a, 52b which project perpendicularly outwardly of the U-shaped channel or clamping means 50. The coupling means or surfaces 52a, 52b may be affixed to the casing 20 of the diode 18 by welding or by other suitable adhesive means. In practice, the correct alignment of the fiber 14 with the input or lens 26 is achieved by the use of a test fiber, immediately prior to the welding or adhesive joining of the coupling surfaces 52a, 52b with the housing 20. A test fiber is placed in the connector 28 which has previously been mounted in the clamping portion 50. The fiber is inserted by use of the tool 42, as more fully described hereinabove, to force the connector elements 30, 32 apart slightly, but by a sufficient amount to permit insertion of the fiber into the channel 34. Thereupon, light energy can be applied to an outer end of the fiber and the output of the diode 18 is monitored as the bracket 60 is moved relative to the diode housing or casing 20 and particularly relative to the lens or optical input 26. When a maximum signal output is observed from the diode 18, the fiber will be properly coaxially aligned with the lens or optical input 26.

Accordingly, upon observing the maximum output from the diode 18, the coupling surfaces 52a, 52b may be affixed to the housing 20 to maintain this alignment of the fiber with the lens or optical input 26. Thereupon, the test fiber may be removed, and it is assured that the groove 34 is thereby so aligned with optical input 26 that a fiber 14 thereafter inserted in the connector 28 will also be properly aligned for achieving an optical connection or optical transmission therebetween. In the illustrated embodiment the ears or surfaces 52a, 52b are generally semicircular in form so as to be complementary in shape with a top surface of the generally cylindrical housing 20.

As best viewed in FIG. 5, the bracket member may be formed from a sheet of flat, preferably metallic material cut into a blank form designated generally by reference numeral 70 in FIG. 5. As shown in FIG. 5 the blank is folded over 90° at each of three fold or bend lines 72, 74 and 76 to form the bracket 60 as illustrated in FIGS. 1-4.

Referring now to FIGS. 7 and 8, a second embodiment of apparatus in accordance with the invention is illustrated, and designated generally by reference numeral 110. In the embodiment of FIGS. 7 and 8, the resilient clamping means and the coupling means are defined by a resilient hinged housing member 120, which is preferably formed in two complementary halves of a polymer material. Preferably, the formation of these halves 120a and 120b forms a clamshell-like structure, as best viewed in FIG. 8, for grippingly engaging the connector elements 30, 32 therebetween. FIG. 7 illustrates the bottom housing half or portion 120b and bottom connector element 32 in this regard. Preferably, this housing 120 is similar in many respects to the polymer body or housing member described in the above-referenced U.S. Pat. No. 5,121,456, the description of which is incorporated herein by reference to the further extent of its description of such a polymer body or housing type element and in particular, the portion of this housing which grippingly engages a pair of aluminum alloy splice elements substantially similar to the connector elements 30, 32 therebetween.

The housing 120 includes a first recess or cavity 122 therein for receiving and maintaining the connector elements 30 and 32 in engagement with each other with sufficient force to retain the optical fiber 14 within the groove 34. In the illustrated embodiment, the cavity 122 is further provided with a pair of raised ribs 124, 126 for maintaining a clamping or engagement force upon the connectors 30, 32. It will be understood that the housing half 120a is of substantially complementary form to the illustrated housing half 120b in FIG. 7. The housing halves further include complementary halves of an opening 128 for receiving the tool 42 therethrough for engagement of the operating portion 62 of the tool with the operating portion or channel or groove 40 of the connector element 28. Preferably, the housing halves 120a and 120b are held together by sonic welding along a complementary raised rib 130 and complementary groove 130a, and also one or more complementary formed and located projections or embossments 132 and receiving apertures 134.

A second cavity 136 is formed in the housing 120 and is generally of complementary form for receiving and holding the housing or casing 20 of the electro-optic device 18 therewithin. In the embodiment illustrated in FIG. 7, the recess or cavity 136 is generally open-ended, whereby a generally annular closure member 138 of somewhat decreased inner diameter is applied over the open end of the cavity 136 for retaining the electro-optic device casing 20 therewithin. The closure member 138 may be affixed by suitable adhesives or by sonic welding, for example. The respective cavities 122 and 136 are formed and located within the housing 120 in such a manner as to assure alignment of the groove 34, and therefore of a fiber 14, with the optical input or lens portion 26 of the device 18.

In the embodiment illustrated in FIG. 7, the housing 110 is further provided with a fiber jacket terminating portion 140 projecting from an end thereof generally opposite the end in which the cavity 136 is formed. The fiber jacket terminating portion generally comprises a cylindrical member having a plurality of axially spaced circumferential annular raised ribs 142 formed thereon. As shown in FIG. 7, some optical fibers are additionally provided with a strengthening portion which generally takes the form of a quantity of fibrous kevlar or similar material 144 which surrounds the buffer portion 12, and an environmentally protective outer jacket 146 of a suitable plastics or other synthetic material surrounding the strengthening member or portion 144. In use, the outer jacket 146 is severed or cut to the extent necessary to provide the buffer portion 12 and projecting fiber 14 of a length sufficient to project into and through the channel 34 for alignment with the device 18 as described hereinabove. However, it is often desirable to maintain the strength of the connection by mechanically engaging the strengthening member or material 144. In the embodiment of FIG. 7, this is done by the fiber jacket terminating portion 140 in cooperation with a generally tubular crimp ferrule 148. That is the ferrule 148 is placed about the fibrous kevlar material 144 which is terminated to about the same length as the buffer portion 16. The ferrule 148 is then compressed about the strengthening elements 144 to press the same against the ribs 142 of the terminating portion 140 and thereby maintain the mechanical strength of the connection of the fiber with the housing 120.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The Invention is claimed as follows:

1. Apparatus for producing a re-enterable optical connection between an optical fiber and an optical device other than an optical fiber, said apparatus comprising: a fiber optic connector comprising a pair of elongated connector elements having facing substantially flat surfaces and means defining an elongated groove in at least one of said surfaces for receiving an optical fiber to be retained between said connector elements; resilient clamping means for maintaining said connector elements in engagement with each other so as to retain said optical fiber in said groove; operating means for accommodating a tool for selectively temporarily overcoming the force of said resilient clamping means for parting said connector elements to an extent necessary to permit movement of an optical fiber in said elongated groove so as to provide for placement, removal, or longitudinal positioning of an optical fiber relative to said elongated groove; and coupling means for joining the connector with said optical device in such a manner that an optical fiber retained in said connector is in optical alignment with a predetermined portion of the optical device.

2. Apparatus according to claim 1 wherein said resilient clamping means and said coupling means comprise a bracket member having an elongate resilient clamping portion for receiving and maintaining said connector elements therebetween and in engagement with each other with sufficient force of engagement to retain an optical fiber within said groove and a coupling portion of complementary configuration with said optical device for mounting thereto.

3. Apparatus according to claim 2 wherein said elongate resilient clamping portion of said bracket member comprises an elongated generally U-shaped channel.

4. Apparatus according to claim 3 wherein said coupling portion of said bracket member comprises a pair of substantially flat surfaces projecting perpendicularly outwardly of said channel.

5. Apparatus according to claim 2 wherein said bracket member is formed of a metallic material.

6. Apparatus according to claim 1 wherein said resilient clamping means and said coupling means comprise a resilient hinged housing member defining a first cavity therein for receiving and maintaining said connector elements in engagement with each other with sufficient force to retain an optical fiber within said groove, and a second cavity therein dimensioned and located for receiving said electro-optic device and aligning said predetermined portion thereof with one end of the fiber-receiving groove of said connector elements.

7. Apparatus according to claim 6 wherein said resilient housing member is formed from a polymer material.

8. Apparatus according to claim 6 wherein said resilient hinged housing member comprises two complementary housing halves, and further including an elongate complementary rib and groove and complementary alignment projections and recesses formed to one side of the axial center of respective ones of said housing halves for interengagement by sonic welding or the like to thereby define a resilient clamshell-like member for grippingly engaging said connector elements therebetween.

9. Apparatus according to claim 6 and further including a retaining member of complementary form for engagement with said resilient hinged housing member about said second cavity therein for retaining said optical device within said second cavity.

10. Apparatus according to claim 6 wherein said resilient housing member further includes a fiber jacket terminating portion projecting from an end of said first cavity oppositely of said second cavity, such that said terminating portion, said second cavity and said first cavity are coaxially aligned.

11. Apparatus according to claim 10 wherein said fiber jacket terminating portion is substantially cylindrical in shape, having a plurality of axially spaced circumferential annular raised ribs.

12. Apparatus according to claim 1 wherein said connector elements are formed of an aluminum alloy.

13. Apparatus according to claim 1 wherein said operating means comprises an elongate opening in said connector substantially parallel to and spaced laterally from said fiber receiving groove.

14. Apparatus according to claim 13 wherein said connector elements further include complementary interfitting alignment means formed to a side of said fiber-optic receiving groove opposite to a side thereof on which said elongate opening comprising said operating means is located.

15. Apparatus according to claim 13 wherein said clamping means grippingly engages said connector elements along an edge thereof to a side of said fiber receiving groove opposite to a side thereof on which said elongate opening comprising said operating means is located.

* * * * *